United States Patent
Kawabe (10) Patent No.: US 7,969,423 B2
(45) Date of Patent: Jun. 28, 2011

(54) DISPLAY CONTROL SYSTEM, OPERATION INPUT APPARATUS, AND DISPLAY CONTROL METHOD

(75) Inventor: Hisashi Kawabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1552 days.

(21) Appl. No.: 11/188,211

(22) Filed: Jul. 22, 2005

(65) Prior Publication Data

US 2006/0028453 A1 Feb. 9, 2006

(30) Foreign Application Priority Data

Aug. 3, 2004 (JP) ................................ 2004-226392

(51) Int. Cl.
*G06F 3/041* (2006.01)

(52) U.S. Cl. ........................................... 345/173; 345/4

(58) Field of Classification Search .......... 345/156–177, 345/178, 4–9, 1.1, 1.2; 349/15; 178/18.01–18.11
See application file for complete search history.

(56) References Cited

U.S. PATENT DOCUMENTS

| | | | | |
|---|---|---|---|---|
| 4,787,040 A * | 11/1988 | Ames et al. | ...................... | 701/1 |
| 5,859,628 A * | 1/1999 | Ross et al. | ..................... | 345/173 |
| 6,144,920 A * | 11/2000 | Mikame | ........................ | 701/212 |
| 6,498,590 B1 * | 12/2002 | Dietz et al. | ................... | 343/893 |
| 6,531,999 B1 * | 3/2003 | Trajkovic | ....................... | 345/157 |
| 7,126,583 B1 * | 10/2006 | Breed | ............................ | 345/158 |
| 7,224,347 B2 * | 5/2007 | Martin et al. | ................. | 345/173 |
| 2003/0006892 A1 | 1/2003 | Church | | |
| 2003/0007227 A1 * | 1/2003 | Ogino | ........................... | 359/227 |
| 2004/0119896 A1 * | 6/2004 | Kean et al. | ..................... | 349/25 |
| 2005/0111100 A1 | 5/2005 | Mather et al. | | |
| 2005/0280636 A1 * | 12/2005 | Hildebrandt et al. | ......... | 345/173 |
| 2006/0191177 A1 | 8/2006 | Engel | | |

FOREIGN PATENT DOCUMENTS

| | | | |
|---|---|---|---|
| JP | 06186526 A | * | 7/1994 |
| JP | 07103778 A | * | 4/1995 |

OTHER PUBLICATIONS

First Office Action dated Sep. 4, 2008 issued in U.S. Appl. No. 11/231,319.
Second Office Action dated Feb. 5, 2009 issued in U.S. Appl. No. 11/231,319.

* cited by examiner

*Primary Examiner* — Nitin Patel
(74) *Attorney, Agent, or Firm* — Brinks Hofer Gilson & Lione (57) ABSTRACT

A system includes a display, a touch panel, a controlling unit, and an LCD driver. The display can display, on a screen, different images when viewed from different sides. The touch panel is disposed on the screen. The controlling unit and the LCD driver cooperate to control the display. In one embodiment, identification signals for uniquely identifying the different sides are generated and are electrically applied to respective operators. A component of the identification signal transmitted through the body of the operator is detected to thereby identify from which side operation input was performed on the touch panel.

20 Claims, 8 Drawing Sheets

DISPLAY CONTROL SYSTEM, OPERATION INPUT APPARATUS, AND DISPLAY CONTROL METHOD

BACKGROUND

1. Field of the Invention

The present invention relates to display control systems. More specifically, the present invention relates to a technology useful for displaying appropriate images corresponding to the left and right sides on the screen of a display unit (e.g., a vehicle-mounted display apparatus) having a configuration in which a touch panel is provided on a liquid crystal display (hereinafter also referred to as a "dual-view LCD"), which can display different images when the same screen is viewed from the left side and the right side.

2. Description of the Related Art

Typically, LCDs (liquid crystal displays) are used as vehicle-mounted display apparatuses. Such a vehicle-mounted LCD is typically installed at the approximate center position of the center console in the vehicle cabin so that the screen can be viewed from both the driver seat and the front passenger seat. In known vehicle-mounted LCDs, a single LCD is used for displaying both a navigation screen and an audio/video (A/V) screen. Thus, when the navigation screen is viewed, the A/V screen cannot be viewed, and when the A/V screen is viewed, the navigation screen cannot be viewed. Further, when the vehicle is moving, a still-image screen such as a navigation screen or the like can be viewed, but a moving-image screen such as a TV screen or DVD screen cannot be viewed in order to ensure safety. With this configuration, since the TV screen or the like cannot be viewed when the vehicle is moving, it is inconvenient for a person in the passenger seat. In this case, dedicated LCDs may be installed for the driver seat and the passenger seat, respectively. However, except for some expensive large vehicles, the installation of two LCDs cannot be afforded since the space of typical vehicle cabins is limited.

Regardless of whether or not a navigation screen is displayed on the LCD, for the passenger in the passenger seat to view a TV screen or the like, he or she needs to perform required operations (such as selecting a source, performing setting, and switching the screen) using a touch panel disposed on the LCD screen or an operation panel disposed in the vicinity of the front seats (typically, on the center console). In this case, although there is no problem when he or she can continue to view the TV screen or the like that has been pre-set, it is practically unreasonable for the passenger in the passenger seat to occupy the LCD, since the driver also wants to see the navigation screen when the vehicle is moving. In such a case, since the passenger needs to perform the required operations again for viewing the TV screen or the like, it is very cumbersome for him or her to perform the operations.

Accordingly, as one variation of LCDs, the development of a "dual-view LCD" that can display different images when the same screen is viewed from the left side and the right side is in progress. When such a dual-view LCD is used as a vehicle-mounted LCD, the passenger in the passenger seat can freely view images (moving images on a TV screen or the like) that are different from images (on a navigation screen) that the driver is viewing.

Figure 1A:
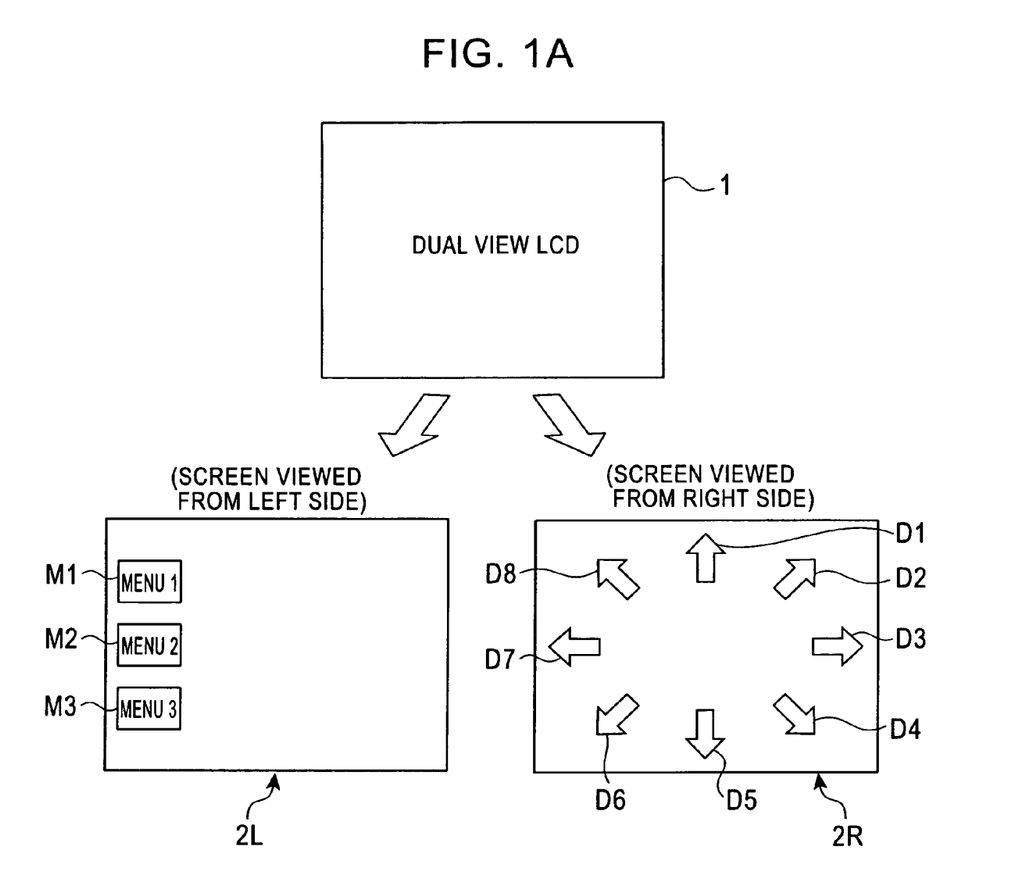
FIGS. 1A and 1B are schematic views illustrating a problem when a dual-view LCD having a touch panel is used.
Figure 1B:
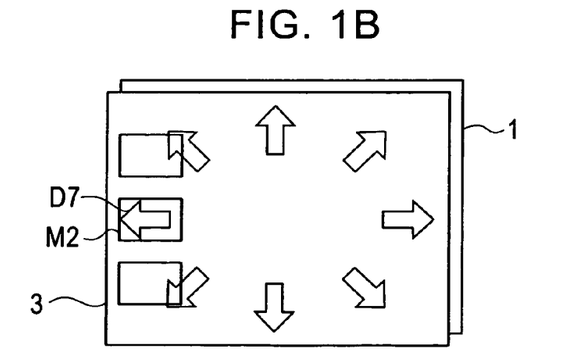

However, when a currently-available touch panel (i.e., an interface that allows input operation, upon the touch of an operation button, icon, or the like displayed on the screen) is provided on the dual-view LCD, an inconvenience occurs when in use. That is, the position of an image operation-button that can be viewed from the left side and an image operation-button that can be viewed from the right side may overlap each other. This is because, while the dual-view LCD displays images (e.g., information, such as operation instructions and various menus associated with operations) that are different from each other toward operators at the left and right sides, the touch panel is disposed on the LCD screen so as to be used by both the operators at the left and right sides. FIGS. 1A and 1B show one example of such a configuration.

In the example shown in FIG. 1A, a dual-view LCD 1 displays direction-indicating buttons (images) D1 to D8 for scrolling a map on a navigation operation screen 2R to an operator at the right side and displays various menu buttons (images) M1 to M3 on a DVD operation screen 2L to an operator at the left side. A touch panel 3 is disposed on the display screen of the LCD 1. As shown in FIG. 1B, on the touch panel 3, the position of the image direction-indicating button D7 viewed from the right side and the position of the image menu-button M2 viewed from the left side overlap each other.

When the position of the image operation-button D7 viewed from the right side and the position of the image operation-button M2 viewed from the left side overlap each other as described above, a determination cannot be precisely made via the touch panel 3 as to which button is operated, that is, as to whether the operator viewing from the right side (i.e., the driver in this case) performed the operation or the operator viewing from the left side (i.e., the passenger in this case) performed the operation. Due to the inability of identifying from which side the operation is performed, a microcomputer (not shown) connected to the touch panel 3 cannot cause the LCD 1 to display, on the display panel thereof, an appropriate image corresponding to an operation entered from the left or right direction (e.g., an image associated with map scrolling, when an operation is performed on the navigation operation screen 2R).

Figure 2:
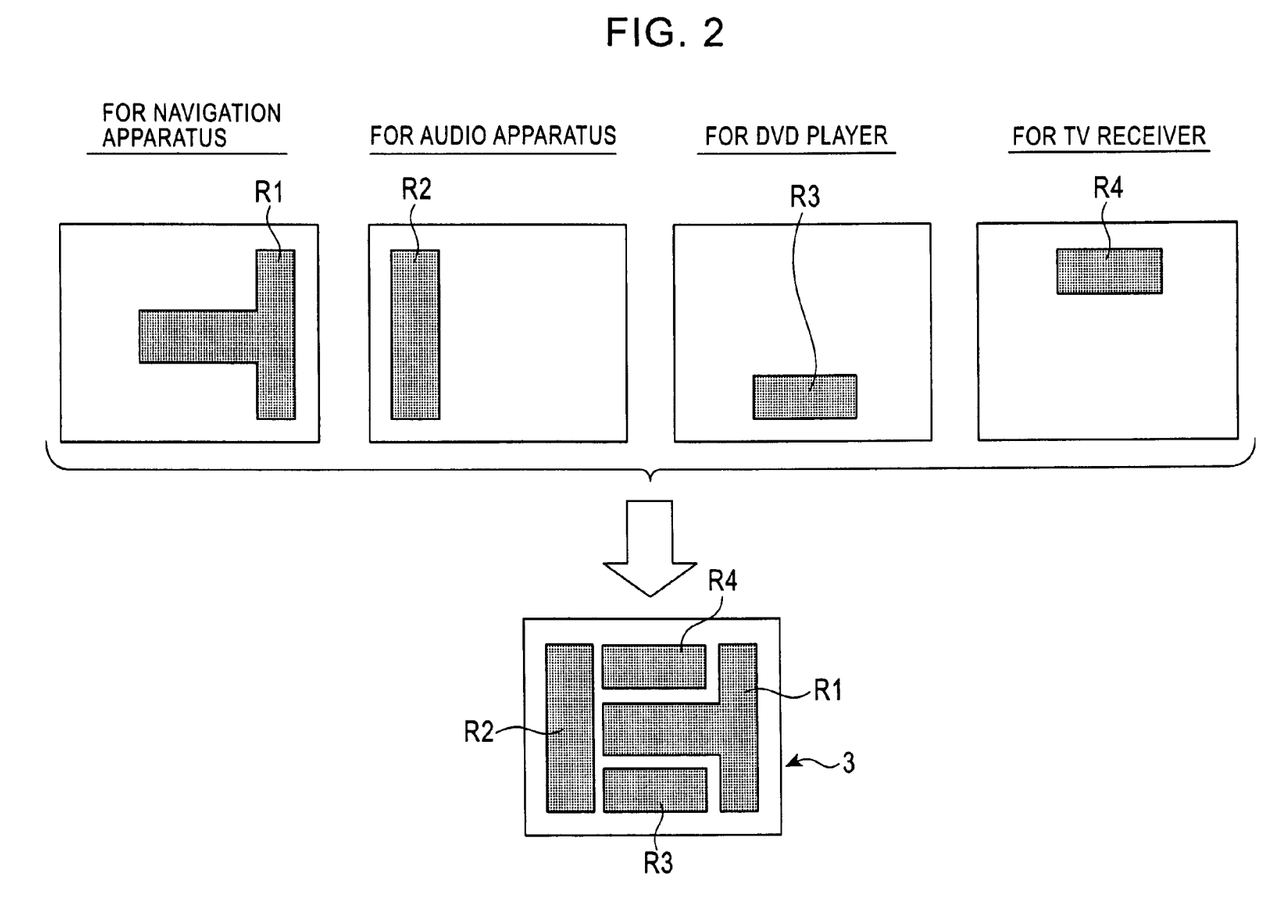
FIG. 2 is a schematic view showing one example of a layout when the positions (operable areas) of operation buttons are assigned, on the touch panel, for respective sources.

To overcome such inconvenience, there is a need to sort positions of operation buttons (for the navigation apparatus and the DVD player in the example of FIG. 1) for sources displayed on the display screen of the LCD. That is, there is a need to assign operable areas on the touch panel for respective sources. FIG. 2 shows one example of a layout when the positions of operation buttons (i.e., the operable areas on the touch panel) are assigned for respective sources. As shown, operable areas R1 to R4 are assigned, on the touch panel 3, for respective sources including a navigation apparatus, an audio apparatus (such as a radio receiver or a CD player), a DVD player, and a TV receiver. This arrangement can prevent the positions of the operation buttons for the different sources from overlapping each other.

As an example of technology related to the known art described above, Japanese Unexamined Patent Application Publication No. 6-186526 discloses a technology in which a single vehicle-mounted LCD can display two screens at the same time so that the two different screens can be viewed from the driver seat and the passenger seat. Further, for example, Japanese Unexamined Patent Application Publication No. 7-103778 discloses a vehicle-mounted navigation apparatus in which the range that can be operated by the driver is restricted while the vehicle is moving. In this technology, whether an operator is the driver or the passenger is identified, so that an operation area corresponding to the operator can be set.

In order to overcome the inconvenience (see FIG. 1B) that can occur with a dual-view LCD having a touch panel, the configurations in the known art requires such a layout that the positions of operation buttons for respective sources (i.e., the touch-panel operable areas R1 to R4 shown in FIG. 2) displayed on the display screen of the LCD do not overlap each other.

Such an arrangement (layout) does not cause a serious problem when the number of available sources (i.e., sources to be displayed on the LCD screen) is small, when the limited size of the touch panel is taken into account. However, when the number of sources increases, inconvenience arises. Specifically, the layout freedom is restricted, the screen design is restricted, and the external appearance is also impaired. That is, there is a problem in that the inconvenience illustrated in FIG. 1B arises, unless the operation buttons are laid out with care.

SUMMARY OF THE INVENTION

The present invention has been made in view of the problems of the related art, and an object of the present invention is to provide a display control system that can precisely determine from which side an operator viewing the screen performed an operation and that can display, on the screen, an appropriate image corresponding to an operation entered from the corresponding side, regardless of the layout of operation buttons.

To overcome the problems of the related art, the present invention provides a display control system. The display control system includes a display unit capable of displaying, on a single screen, images that are different from each other when viewed from different sides; and a touch-type operation input portion disposed on the screen of the display unit. The display control system further includes an operation-input-direction identification portion for determining from which of the different sides an operation input is performed on the touch-type operation input portion; an operation-input detector for detecting an operation entered from the side identified by the operation-input-direction identification portion; and a controller that causes an image corresponding to the operation entered from the identified side to be displayed on the screen of the display unit, in accordance with an output from the operation-input detector.

According to the display control system of the present invention, the operation-input direction identification portion can identify from which of the left and right sides a viewer touched the screen of the display unit (i.e., performed operation input). Thus, without caring about the positions (layout) of operation buttons, it is possible to freely design the screen. In other words, no matter which position an operation button is arranged (i.e., an improvement in layout freedom), the controlling unit cooperates with the operation-input-direction identification portion to thereby make it possible to precisely identify from which of the left and right sides the operation button was operated. Based on the result, appropriate images corresponding to an operation entered from a corresponding side can be displayed on screen of the display unit.

DESCRIPTION OF THE PREFERRED EMBODIMENTS

An embodiment of the present invention will be described below with reference to the accompanying drawings.

Figure 3:
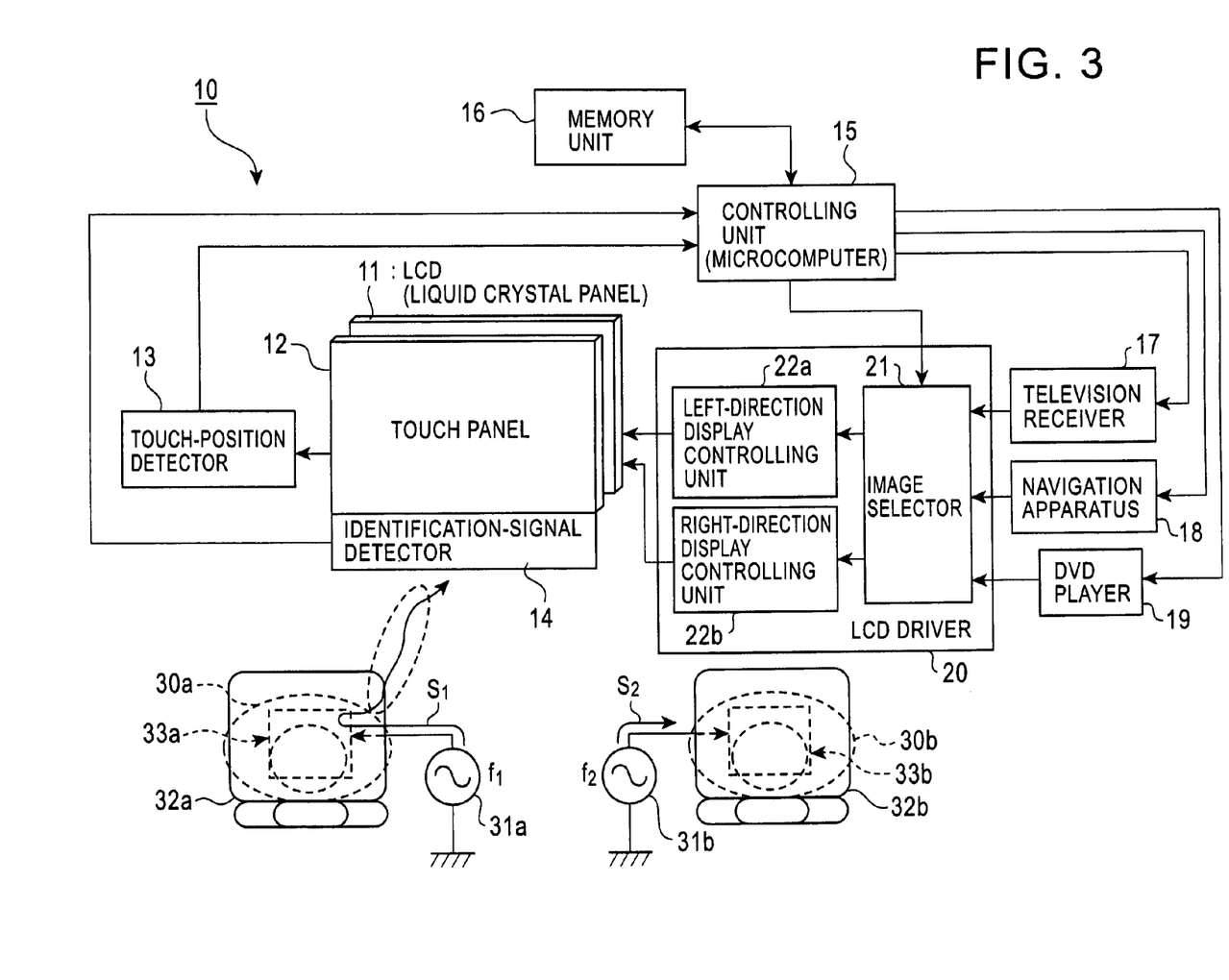
FIG. 3 is a block diagram showing the configuration of a system in which a display control system according to an embodiment of the present invention is applied to a vehicle.

FIG. 3 is a block diagram schematically showing the configuration of a system in which a display control system according to an embodiment of the present invention is applied to a vehicle.

A vehicle-mounted display control system 10 according to the present embodiment includes a dual-view LCD (liquid crystal display/panel) 11, a touch panel 12 disposed on the screen of the LCD 11, a touch-position detector 13, an identification-signal detector 14, a controlling unit 15 for controlling the entire system, a memory unit 16, and various sources (a television receiver 17, a navigation apparatus 18, and a DVD player 19 in the illustrated example). The display control system 10 further includes an LCD driver 20, signal generators 31a and 31b for generating signals (identification signals) $S_1$ and $S_2$ having frequencies $f_1$ and $f_2$ different from each other, and conductive members (electrodes) 33a and 33b to which the identification signals $S_1$ and $S_2$ are supplied from the generators 31a and 31b. Similar to the LCD 1 shown in FIG. 1, the LCD 11 has a function (dual-view function) that can display different images when the same screen is viewed from the right side and left side (i.e., from a driver seat 32b and a front passenger seat 32a, in the example shown in FIG. 3). This dual-view function will be described later. The touch panel 12 includes transparent electrodes disposed on the display surface of the LCD 11 and may employ a known system, such as a pressure-sensitive system or capacitance-coupling system. The LCD 11, on which the touch panel 12 is disposed, is arranged on the center console (not shown) between the driver seat 32b and the passenger seat 32a in the vehicle cabin. Both a driver 30b (indicated by a dotted line in the figure) seated in the driver seat 32b and a passenger 30a (indicated by a dotted line) seated in the passenger seat 32a can view the display screen of the LCD 11 and can operate the touch panel 12.

The signals (identification signals) $S_1$ and $S_2$ that have respective frequencies $f_1$ and $f_2$ and that are generated from the respective generators 31a and 31b are used to identify directions in which the LCD 11 independently displays images toward the operators 30a and 30b, i.e., the seats 32a and 32b (i.e., an operation input direction) in which the operators 30a and 30b are seated. The identification signals $S_1$ and $S_2$, which are generated by the generators 31a and 31b, are electrically applied to the operators 30a and 30b, seated in the seats 32a and 32b, via the corresponding electrodes 33a and 33b. The applied identification signals $S_1$ and $S_2$ are transmitted to the identification-signal detector 14 through the bodies of the operators 30a and 30b. Thus, the electrodes 33a and 33b are arranged adjacent to the corresponding seats 32a and 32b. The arrangement of the electrodes 33a and 33b for applying the identification signals $S_1$ and $S_2$ will be described later.

The touch-position detector 13 detects a position (i.e., an operation position), on the touch panel 12, touched by the finger of the operator 30a or 30b. The result of the detection is supplied to the controlling unit 15. Similarly, when the touch panel 12 is operated, the identification-signal detector 14 detects the identification signal (i.e., the identification signal $S_1$ having frequency $f_1$ or the identification signal $S_2$ having frequency $f_2$) transmitted through the body of the operator 30a or 30b who performed the operation and supplies the detection result to the controlling unit 15. The controlling unit 15 is implemented with a microcomputer or the like, and identifies the operator 30a or 30b (i.e., the operation input direction) and controls the display of the LCD 11 in accordance with the identification, as described below. The memory unit 16 stores information that specifies the relationship between the seats (the passenger seat 32a and the driver seat 32b), in which the operators 30a and 30b who perform operation input on the touch panel 12 are seated, and information for uniquely identifying the seats 32a and the 32b, i.e., the frequencies $f_1$ and $f_2$ of the identification signals $S_1$ and $S_2$ generated by the generators 31a and 31b.

Basic operations of the sources (i.e., the television receiver 17, the navigation apparatus 18, and the DVD player 19) include receiving data associated with an operation instruction issued from the controlling unit 15, changing the operation state of the source in accordance with the received data, and supplying data indicating the change result (an operation state associated with the operation input) to the LCD driver 20. Under the control of the controlling unit 15, the LCD driver 20 drives the LCD 11. As shown, The LCD driver 20 includes an image selector 21, a left-side display controlling unit 22a and a right-side display controlling unit 22b. The image selector 21 sorts data received from the sources 17 to 19 into images for the left side (i.e., in the direction of the passenger seat 32a) and images for the right side (i.e., in the direction of the driver seat 32b) and selectively outputs image data. In accordance with the image data supplied from the image selector 21, the left-side display controlling unit 22a and the right-side display controlling unit 22b control the LCD 11 so as to display, on the LCD screen, images corresponding to the passenger seat 32a (the passenger 30a) and the driver seat 32b (the driver 30b).

Figure 4:
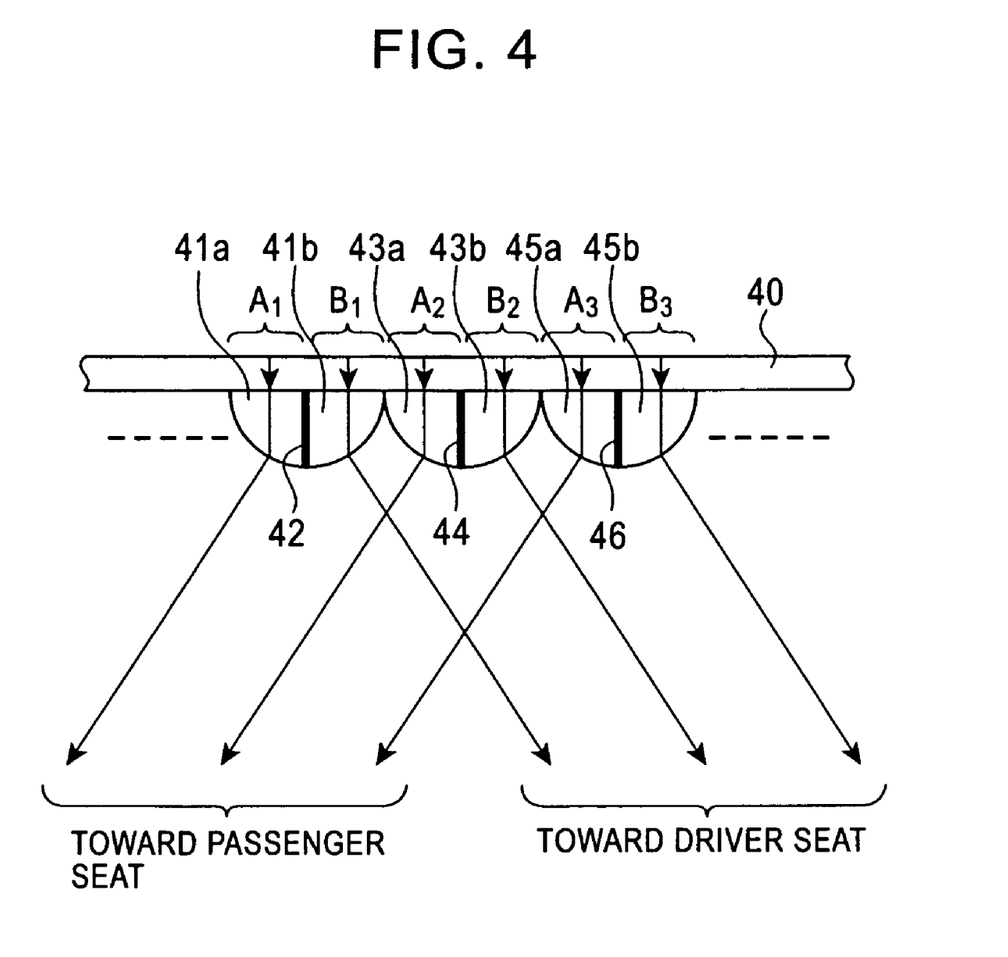
FIG. 4 is a schematic view illustrating dual views of the LCD (liquid crystal display/panel) in the system shown in FIG. 3.

Next, the dual-view function of the LCD 11 will be described with reference to FIG. 4.

A large number of pixels are arranged in a matrix on the screen (a liquid crystal surface 40) of the LCD 11 and are divided into two groups. On a screen constituted by pixels (A1 to A3 in the illustrated example) belonging to one group, image data supplied from the left-side display controlling unit 22a of the LCD driver 20 is displayed. On a screen constituted by pixels ($B_1$ to $B_3$ in the illustrated example) belonging to the other group, image data supplied from the right-side display controlling unit 22b is displayed. Quadrant-cylinder-shaped lenses 41a, 43a, and 45a are disposed on the surface of the pixel array including the pixels $A_1$ to $A_3$ arranged on the liquid crystal surface 40. Similarly, quadrant-cylinder-shaped lenses 41b, 43b, and 45b are disposed on the surface of the pixel array constituted by the pixels $B_1$ to $B_3$. Further, the lens 41a and the lens 41b are closely attached with a light-shielding plate 42 interposed therebetween, the lens 43a and the lens 43b are closely attached with a light-shielding plate 44 interposed therebetween, and the lens 45a and the lens 45b are closely attached with a light-shielding plate 46 interposed therebetween.

With the configuration of the LCD 11, light emitted from the pixels $A_1$ to $A_3$ belonging to one group is refracted at the peripheral surfaces of the lenses 41a, 43a, and 45a diagonally toward the left (i.e., in the direction of the passenger seat). On the other hand, light emitted from the pixels $B_1$ to $B_3$ belonging to the other group is refracted at the peripheral surfaces of the lenses 41b, 43b, and 45b diagonally toward the right (i.e., in the direction of the driver seat). As a result, using the single LCD 11, it is possible to simultaneously view two different screens (i.e., the dual-view function). For example, when DVD-image data is supplied from the left-side display controlling unit 22a of the LCD driver 20 and navigation-image data is supplied from the right-side display controlling unit 22b, the driver 30b in the driver seat 32b can view a navigation screen displayed on the LCD 11 and the passenger 30a in the passenger seat 32a can also view a DVD screen displayed on the same LCD 11.

Next, the arrangement of the electrodes 33a and 33b for applying the identification signals $S_1$ and $S_2$ will be described with reference to FIG. 5.

Figure 5A:
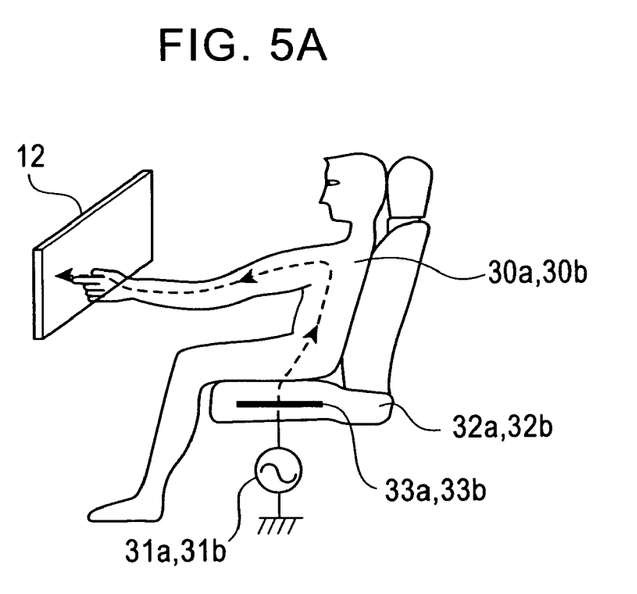
FIGS. 5A and 5B are views showing the arrangements of electrodes for applying identification signals in the system shown in FIG. 3.

As shown in FIG. 5A, the electrodes 33a and 33b, which are used for applying the identification signals $S_1$ and $S_2$ generated by the generators 31a and 31b to the operators 30a and 30b, respectively, are embedded in the corresponding seats (the passenger seat 32a and the driver seat 32b) in which the operators 33a and 33b are seated. The electrodes 33a and 33b are made of flexible conductive material, such as conductive rubber, since force is exerted on the seats 32a and 32b when the operators 30a and 30b are seated. However, material for the electrodes 33a and 33b is of course not limited to the above-mentioned material. With such an arrangement, the identification signal $S_1$ (or $S_2$) generated by the generator 31a (or 31b) is electrically applied to the corresponding operator 30a (or 30b) via the electrode 33a (or 33b). The applied identification signal is then transmitted to the touch panel 12 through the body of the operator, as indicated by the dotted line in FIG. 5A, and is detected by the identification-signal detector 14 (see FIG. 3).

Figure 5B:
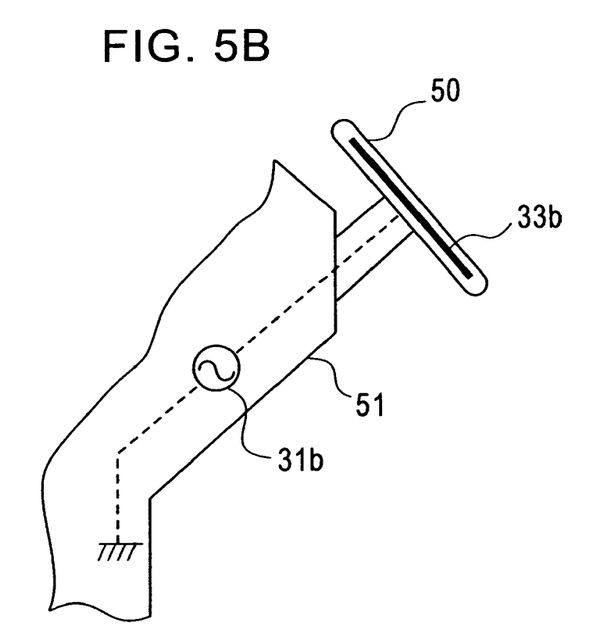

In the example shown in FIG. 5A, the electrodes 33a and 33b are embedded in the seats 32a and 32b. However, as apparent from the function of the electrodes 33a and 33b, it is sufficient if they are arranged adjacent to the operators 30a and 30b. Thus, the electrodes 33a and 33b do not necessarily need to be embedded in the seats 32a and 32b. FIG. 5B shows an exemplary configuration of such a case. In the example shown in FIG. 5B, at the driver-seat side, the electrode 33b corresponding to the generator 31b is embedded in a steering wheel 50. In this case, the generator 31b is disposed in a dashboard 51.

In the vehicle-mounted display control system 10 configured as described above, the dual-view LCD (liquid crystal display/panel) 11 corresponds to a "display unit", the touch panel 12 corresponds to a "touch-type operation input portion", the touch-position detector 13 corresponds to an "operation-input detector", the memory unit 16 corresponds to a "storage unit", and the controlling unit 15 and the LCD driver 20 correspond to a "controller". Further, the generators 31a and 31b correspond to "identification-signal generators"; the electrodes 33a and 33b correspond to "identification-signal applying portions"; and the generators 31a and 31b, the electrodes 33a and 33b corresponding thereto, and the identification-signal detector 14 constitute an "operation-input-direction identification portion".

Figure 6:
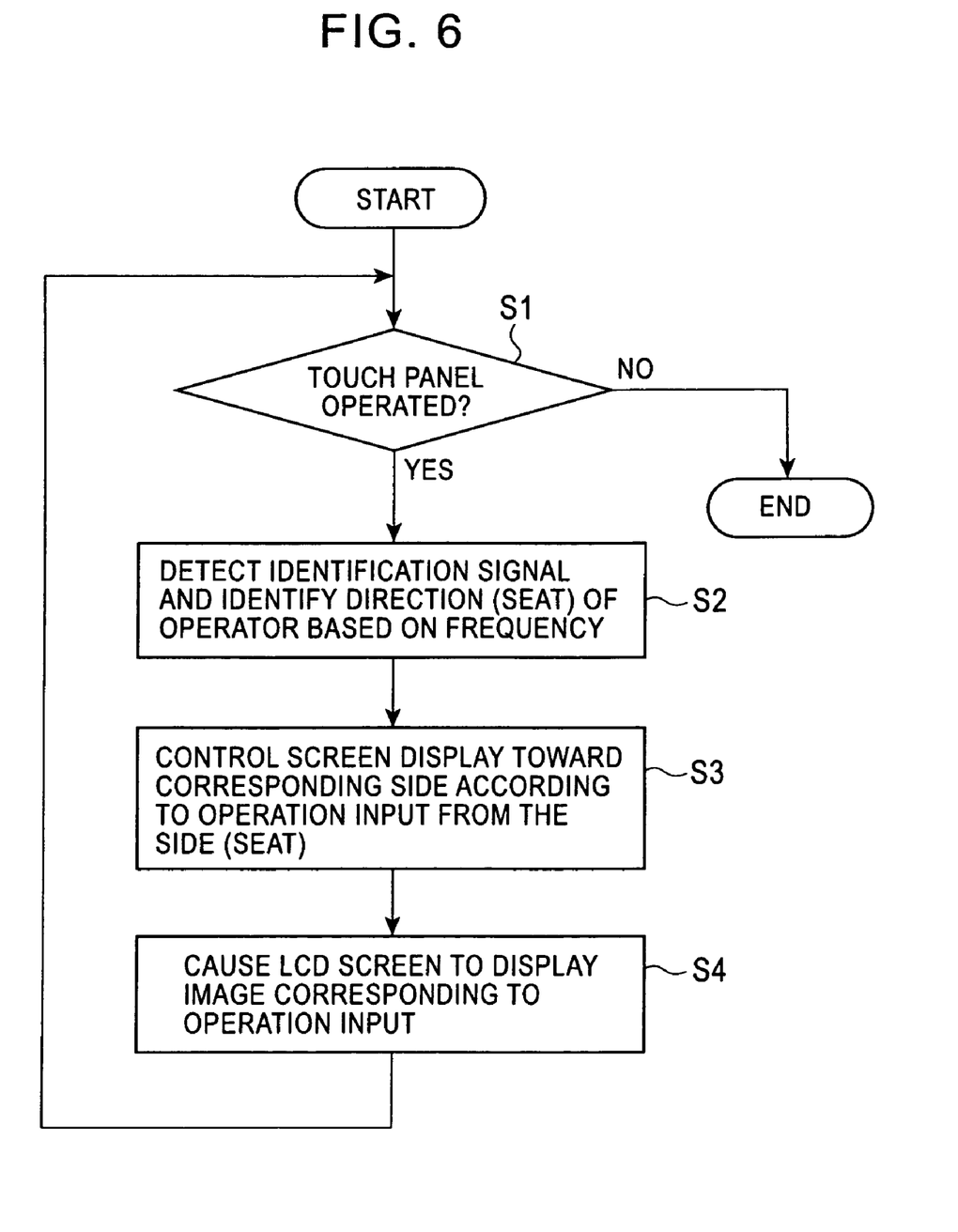
FIG. 6 is a flow chart showing one example of processing, performed by a controlling unit in the system shown in FIG. 3, for identifying an operator (i.e., an operation input direction) and controlling the display of the LCD in accordance with the identification.

Next, processing performed by the controlling unit 15 in the vehicle-mounted display control system 10 of the present embodiment for identifying the operator 30a or 30b (i.e., the operation input direction) and controlling the display of the LCD 11 in accordance with the identification will be described with reference to an example of a processing flow shown in FIG. 6.

First, in step $S_1$, through the touch-position detection 13, the controlling unit 15 determines whether the finger of the passenger 30a or the driver 30b has touched the touch panel 12 (YES) or not (NO), i.e., whether an operation is performed on the touch panel 12 or not. When the determination result is YES, the flow proceeds to step S2, and when the determination result is NO, the flow ends.

Next, in step S2, the identification-signal detector 14 detects components of the identification signal (the identification signal $S_1$ having frequency $f_1$ or the identification signal $S_2$ having frequency $f_2$) transmitted through the body of the passenger 30a or the driver 30b who performed the operation, and, further, the controlling unit 15 refers to information stored in the memory unit 16 to identify the frequency of the detected identification signal, thereby identifying the direction (the passenger seat 32a or the driver seat 32b) of the corresponding operator. That is, the controlling unit 15 determines from which of the left and right sides the operation input was performed on the touch panel 12.

Next, in step S3, under the control of the controlling unit 15, the LCD driver 20 (the left-side and right-side display controlling units 22a and 22b) controls the screen display toward the corresponding side (i.e., controls the display of an image to be displayed on the LCD screen) so as to correspond to the operation entered from the side (i.e., the passenger seat 32a or the driver seat 32b).

Next, in step S4, under the control of the controlling unit 15, an image corresponding to content of the operation carried out from the determined operation input direction (i.e., the passenger seat 32a or the driver seat 32b) is displayed on the screen of the LCD 11 by the LCD driver 20. Subsequently, the flow returns to step $S_1$ and the above-described processing is repeated.

As described above, according to the vehicle-mounted display control system 10 of the present embodiment, the identification signals $S_1$ and $S_2$ are generated by the generators 31a and 31b, arranged adjacent to the seats 32a and 32b, and are applied to the corresponding operators 30a and 30b in the seats through the electrodes 33a and 33b, and the resulting identification signal transmitted through the body of the operator is detected by the identification-signal detector 14. Thus, in accordance with the identification signal $S_1$ or $S_2$ and information stored in the memory unit 16, the controlling unit 15 can determine which of the people seated in the seats performed the operation.

As described above, the vehicle-mounted display control system 10 can identify from which of the left and right sides a person viewing the screen of the LCD 11 (i.e., the passenger 30a or the driver 30b) operated an operation button on the touch panel 12. Thus, without caring about the layout of operation buttons, it is possible to freely design the screen. That is, no matter at which position an operation button is arranged on the panel, the controlling unit 15 can precisely identify from which of the left and right sides the operation button was operated. Thus, an appropriate image corresponding to the operation entered from the corresponding direction can be displayed on the LCD 11. For example, this arrangement can determine an operation menu displayed, on the screen, toward a corresponding operator, to thereby allow the function of a menu corresponding to the operation instruction to be executed.

The description for the above embodiment has been given in conjunction with an example in which the generators 31a and 31b, the electrodes 33a and 33b corresponding thereto, and the identification-signal detector 14 are provided as means (i.e., an operation-input-direction identification portion) for identifying from which of the left and right sides an operation input was performed on the touch panel 12. However, the configuration of the operation-input-direction identification portion naturally is not limited to the illustrated example and various other configurations are also possible.

Figure 7A:
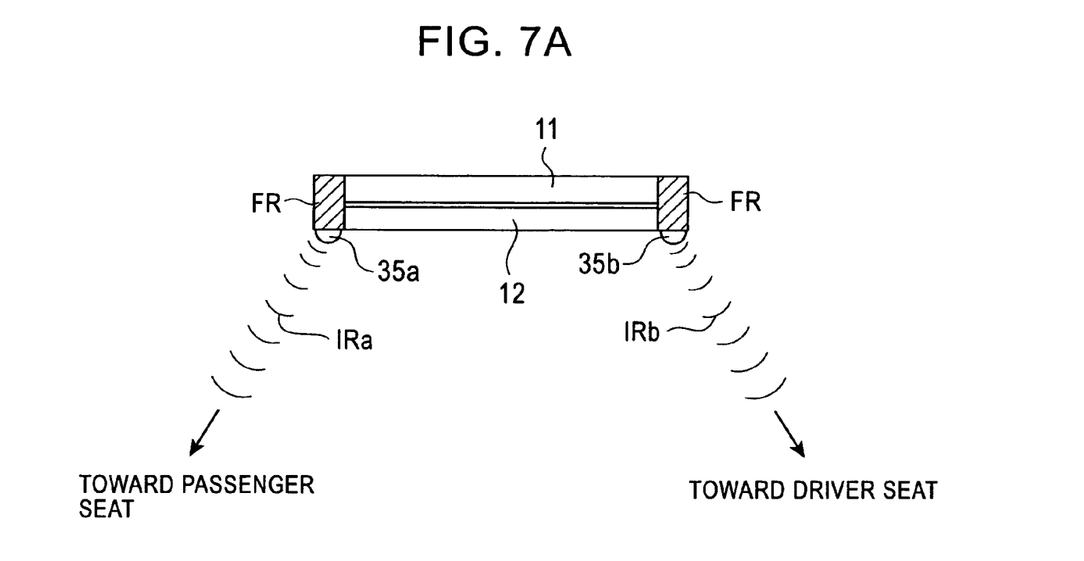
FIGS. 7A and 7B are views illustrating another configuration of an operation-input-direction identification portion.
Figure 7B:
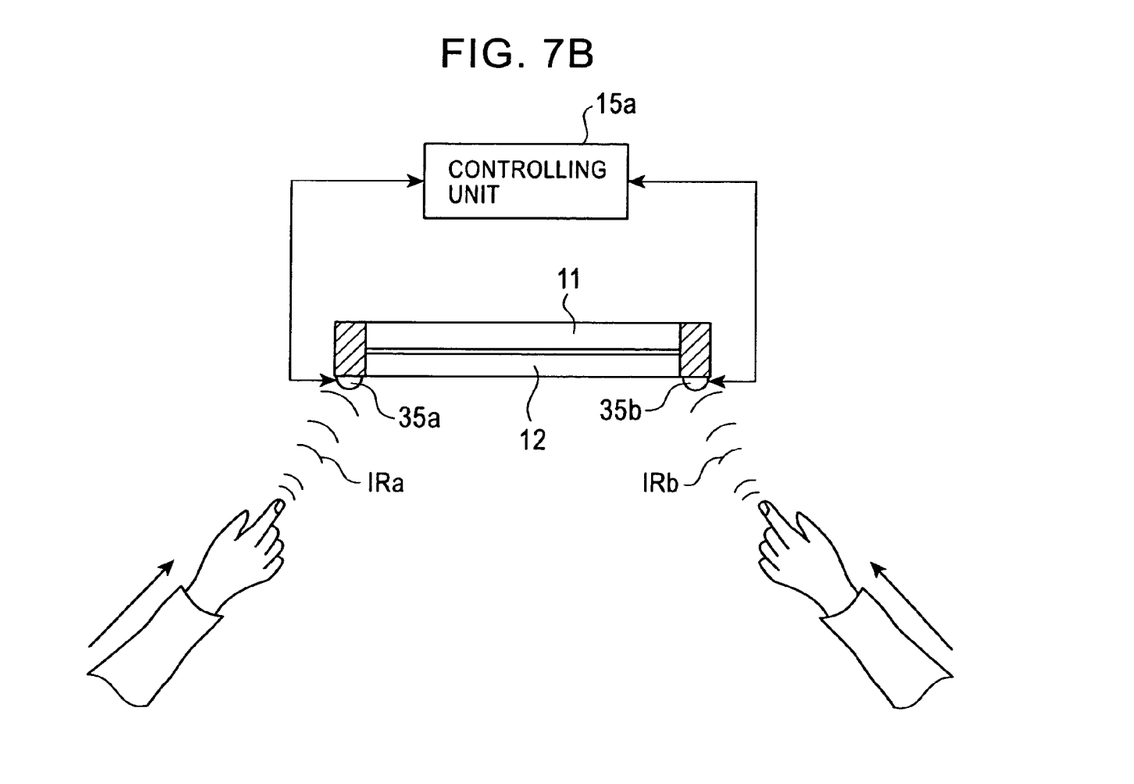

For example, as illustrated in FIGS. 7A and 7B, infrared sensors (including light-emitting portions and light-receiving portions) 35a and 35b may be provided in the vicinities of the left end and the right end of a frame (a support) FR that supports the LCD 11 having the touch panel 12. In this case, the light-emitting portions radiate infrared rays IRa and IRb toward the operators in the passenger seat and the driver seat, respectively (see FIG. 7A). When the hand or finger of the operator in each seat approaches a predetermined distance (i.e., the radiation area of the infrared rays) from the operation surface of the touch panel 12 (see FIG. 7B), the light-receiving portion of the infrared sensor 35a or 35b can detect the infrared ray IRa or IRb reflected by the hand or finger of the operator and, based on the result of the detection, a controlling unit 15a can determine from which of the left and right sides the operation input was performed.

Figure 8A:
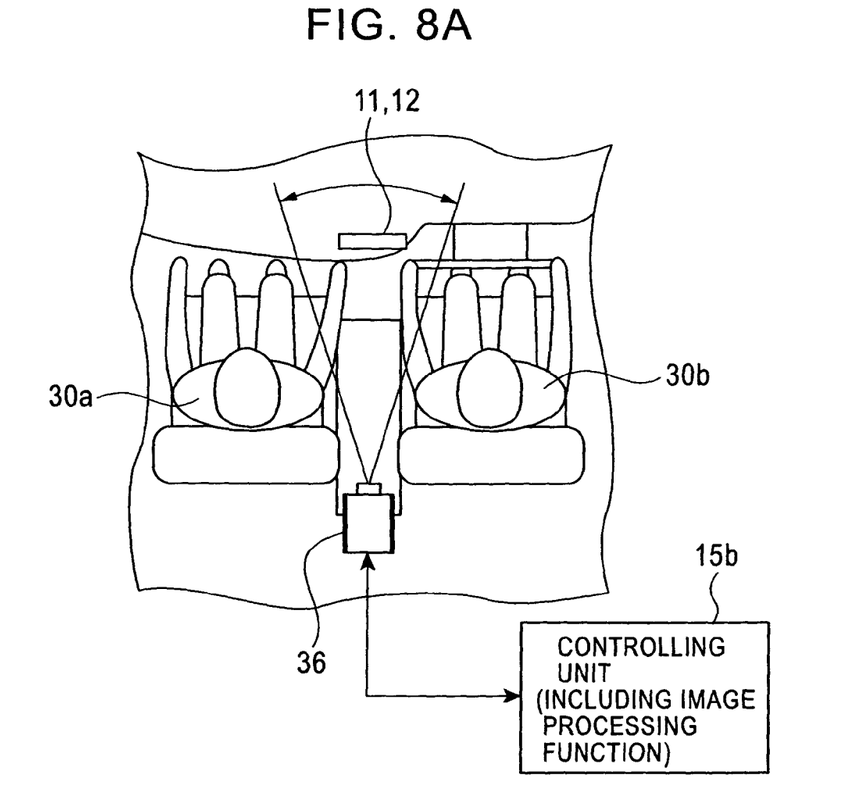
FIGS. 8A and 8B are views illustrating still another configuration of the operation-input-direction identification portion.
Figure 8B:
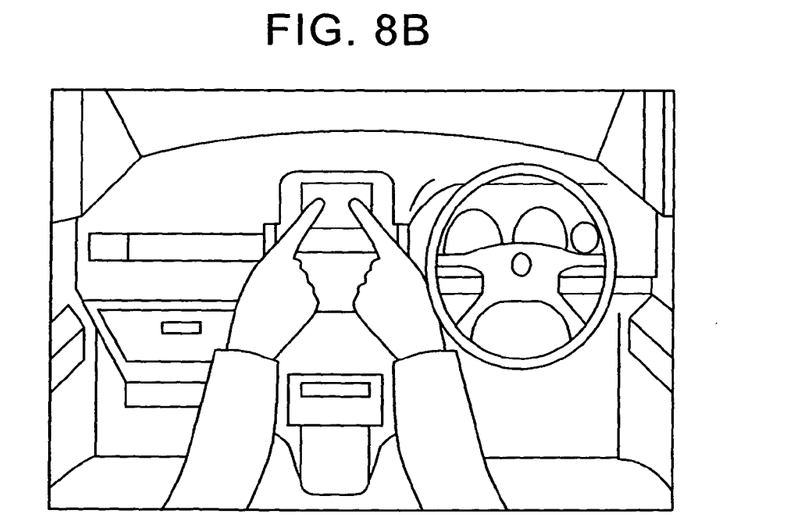

Alternatively, as illustrated in FIGS. 8A and 8B, a camera 36 (see FIG. 8A) may be disposed at an appropriate spot in the vehicle cabin (e.g., at the rear side at the ceiling in the vehicle cabin) so that the image-capture area of the camera 36 covers the LCD 11 having the touch panel 12. In this case, when the hand or finger of the operator 30a and 30b in the passenger seat and the driver seat approaches the operation surface of the touch panel 12, an image of this state is captured by the camera 36 (see an exemplary captured-image shown in FIG. 8B). The result of the image-capture is then subjected to image processing by a controlling unit 15b and, in accordance with the processing result, a determination can be made as to which of the left and right sides the operation input was performed.

As still another configuration, which is not shown, respective switches dedicated to respective operators in the passenger seat and the driver seat may be provided at appropriate positions at the left and right sides on the touch panel 12, so that each operator performs operation input on the touch panel 12 after pressing the corresponding dedicated switch or performs operation input on the touch panel 12 while pressing the corresponding switch. In this case, in accordance with a determination result indicating whether or not the switch is operated and with a determination result sent from the touch-position detector 13, the controlling unit 15 identifies from which of the left and right directions the operation input was performed. With the configuration in which operation input is performed after the dedicated switch is pressed, the controlling unit 15 may measure the time required from when the switch is operated until the touch panel 12 is operated. When the measured time is less than a predetermined time, it is determined that the operation input was performed from the identified direction, and when the measured time exceeds the predetermined time, it is determined that no operation input was performed from the identified direction.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display control system, comprising:
    a display unit capable of displaying, on a single screen, images that are different from each other when viewed from a first viewing side and from a second viewing side opposite the first viewing side, respectively;
    the images including a first set of indicating buttons configured to be viewable only from the first viewing side and a second set of indicating buttons configured to be viewable only from the second viewing side, wherein the first set of indicating buttons overlaps the second set of indicating buttons on the single screen:
    a touch-type operation input portion disposed on the screen of the display unit configured to receive input from corresponding indicating buttons;
    an operation-input-direction identification portion that determines if an operation input is performed on the first viewing side or on the second viewing side of the touch-type operation input portion based on an identification of high-frequency electrical signals induced into a body of an operator and received from the body of the operator;
    an operation-input detector that detects an operation input from the corresponding viewing side identified by the operation-input-direction identification portion regardless of overlap of the indicating buttons on the first and second viewing sides; and
    a controller that causes an image corresponding to the operation input from the identified viewing side to be displayed on the screen of the display unit, in accordance with an output from the operation-input detector.

2. The display control system according to claim 1, wherein the operation-input-direction identification portion comprises
    identification signal generators that generate identification signals for uniquely identifying the respective different directions;
    identification-signal applying portions that electrically apply the generated identification signals to at least one operator at the different sides; and an identification-signal detector that detects a component of the identification signal transmitted through the body of the operator.

3. The display control system according to claim 2, wherein the display control system is installed in a vehicle.

4. The display control system according to claim 3, wherein the display unit comprises a liquid crystal display that is capable of displaying different images toward a driver seat and a passenger seat, respectively, in the cabin of the vehicle, and the touch-type operation input portion comprises a touch panel disposed on the screen of the liquid crystal display.

5. The display control system according to claim 4, wherein the identification-signal generators are provided so as to correspond to the driver seat and the passenger seat and comprise generators that generate signals having frequencies different from each other.

6. The display control system according to claim 5, wherein the identification-signal applying portions comprise conductive members that are embedded in the driver seat and the passenger seat, respectively.

7. The display control system according to claim 5, wherein one of the identification-signal applying portions comprises a conductive member embedded in a steering wheel.

8. The display control system according to claim 5, further comprising a storage unit that stores information specifying a relationship between the driver and passenger seats and the frequencies of the signals generated by the generators provided for the respective seats.

9. The display control system according to claim 8, wherein the operation-input detector comprises a touch-position detector that detects a position on the touch panel, the position being touched by the operator's finger.

10. The display control system according to claim 9, wherein the controller comprises a display controlling unit, wherein, when the touch panel is operated, the display controlling unit identifies the seat in which the operator is seated based on the information stored in the storage unit and controls the liquid crystal display to display a screen toward the identified seat in accordance with an output from the touch-position detector.

11. The display control system according to claim 1, wherein the operation-input-direction identification portion radiates infrared rays to, of the different sides, a side at which an operator is present when viewed from the touch-type operation input portion, and comprises at least one detector that detects resulting infrared rays reflected by the operator's hand or finger.

12. The display control system according to claim 11, wherein the display control system is installed in a vehicle.

13. The display control system according to claim 12, wherein the display unit comprises a liquid crystal display that is capable of displaying different images toward a driver seat and a passenger seat, respectively, in the cabin of the vehicle, and the touch-type operation input portion comprises a touch panel disposed on the screen of the liquid crystal display.

14. The display control system according to claim 1, wherein the operation-input-direction identification portion comprises an image-capture unit that captures an image of, of the different sides, a side at which an operator is present when viewed from the touch-type operation input portion.

15. The display control system according to claim 1, wherein the operation-input-direction identification portion comprises switches dedicated to the respective operators who are at the different sides.

16. An operation input apparatus, comprising:
    a display unit capable of displaying, on a single screen, images that are different from each other when viewed from a first viewing side and from a second viewing side opposite the first viewing side, respectively;
    the images including a first set of indicating buttons configured to be viewable only from the first viewing side and a second set of indicating buttons configured to be viewable only from the second viewing side, wherein the first set of indicating buttons overlaps the second set of indicating buttons on the single screen;
    a touch-type operation input portion disposed on the screen of the display unit configured to receive input from corresponding indicating buttons;
    an operation-input-direction identification portion that determines if an operation input is performed on the first viewing side or on the second viewing side of the touch-type operation input portion based on an identification of high-frequency electrical signals induced into a body of an operator and received from the body of the operator;

an operation-input detector that detects an operation entered from the corresponding viewing side identified by the operation-input-direction identification portion regardless of overlap of the indicating buttons on the first and second viewing sides; and a controller that performs control corresponding to an image displayed on the viewing side identified by the operation-input-direction identification portion, when the operation-input detector detects an operation input.

17. The operation input apparatus according to claim 16, wherein the operation-input-direction identification portion radiates infrared rays to, of the different sides, a side at which an operator is present, viewed from the touch-type operation input portion, and comprises at least one detector that detects resulting infrared rays reflected by the operator's hand or finger.

18. The operation input apparatus according to claim 17, wherein the operation input apparatus is installed in a vehicle.

19. The operation input apparatus according to claim 18, wherein the display unit comprises a liquid crystal display that is capable of displaying different images toward a driver seat and a passenger seat, respectively, in the cabin of the vehicle, and the touch-type operation input portion comprises a touch panel disposed on the screen of the liquid crystal display.

20. A display control method for a display apparatus having a display unit capable of displaying, on a single screen, images that are different from each other when viewed from a first viewing side and from a second viewing side opposite the first viewing side, respectively, the images including a first set of indicating buttons configured to be viewable only from the first viewing side and a second set of indicating buttons configured to be viewable only from the second viewing side, wherein the first set of indicating buttons overlaps the second set of indicating buttons on the single screen, and a touch-type operation input portion disposed on the screen of the display unit configured to receive input from corresponding indicating buttons, the method comprising:

determining from which of the viewing sides an operation input is performed on the touch-type operation input portion based on an identification of high-frequency electrical signals induced into a body of an operator and received from the body of the operator;

detecting an operation entered from the corresponding identified viewing side regardless of overlap of the indicating buttons on the first and second viewing sides; and causing an image corresponding to the operation entered from the identified viewing side to be displayed on the screen of the display unit, in accordance with the detected operation input.

* * * * *